(12) United States Patent
Lubben et al.

(10) Patent No.: US 10,981,416 B2
(45) Date of Patent: Apr. 20, 2021

(54) HIGH TRACK DRIVE SYSTEM FOR TRACK WORK VEHICLE

(71) Applicant: Deere & Company, Moline, IL (US)

(72) Inventors: Jeffrey L. Lubben, Hudson, IA (US); Mark W. Freudenberg, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 40 days.

(21) Appl. No.: 16/577,132

(22) Filed: Sep. 20, 2019

(65) Prior Publication Data

US 2020/0009910 A1 Jan. 9, 2020

Related U.S. Application Data

(63) Continuation of application No. 15/655,733, filed on Jul. 20, 2017, now Pat. No. 10,457,097.

(51) Int. Cl.
*B60B 35/12* (2006.01)
*F16H 37/08* (2006.01)
(Continued)

(52) U.S. Cl.
CPC ............ *B60B 35/125* (2013.01); *B60B 35/14* (2013.01); *B60K 17/046* (2013.01); *B60K 17/16* (2013.01);
(Continued)

(58) Field of Classification Search
CPC ... B60B 35/125; B60B 35/14; F16H 37/0813; F16H 48/08; F16H 57/042; F16H 57/0483; F16H 57/0495
See application file for complete search history.

(56) References Cited

U.S. PATENT DOCUMENTS 854,364 A 5/1907 Lombard
2,845,818 A 8/1958 Siljander
(Continued)

FOREIGN PATENT DOCUMENTS

EP 2883735 A1 6/2015

OTHER PUBLICATIONS

Tracked, Articulated and Offset Drives Throughout History, undated, admitted prior art. (15 pages).
(Continued)

*Primary Examiner* — David R Morris
(74) *Attorney, Agent, or Firm* — Klintworth & Rozenblat IP LLP

(57) ABSTRACT

A track work vehicle includes an axle input shaft defining a first axis of rotation, and a differential gear case having at least one planetary gear set. The track work vehicle includes a track drive system contained, at least in part, in the differential gear case. The track drive system includes a first gear coupled to the axle input shaft and a second gear coupled to the first gear. The track drive system includes a bevel gear assembly coupled to the second gear and a bevel gear set coupled to the planetary gear set. The track work vehicle includes at least one drive axle coupled to the planetary gear set and a drive wheel for driving a continuous ground-engaging track. The drive axle has a second axis of rotation that is vertically offset from the first axis of rotation and substantially coaxial with a centerline of the drive wheel.

20 Claims, 8 Drawing Sheets

(51) Int. Cl.

| | | |
|---|---|---|
| *F16H 48/08* | (2006.01) | |
| *B60K 17/16* | (2006.01) | |
| *F16H 57/04* | (2010.01) | |
| *B62D 55/125* | (2006.01) | |
| *B60K 17/04* | (2006.01) | |
| *B60B 35/14* | (2006.01) | |
| *B60K 17/344* | (2006.01) | |
| *B62D 55/065* | (2006.01) | |
| *F16H 57/037* | (2012.01) | |

(52) U.S. Cl.
CPC .......... *B60K 17/165* (2013.01); *B62D 55/125* (2013.01); *F16H 37/0813* (2013.01); *F16H 48/08* (2013.01); *F16H 57/042* (2013.01); *F16H 57/045* (2013.01); *F16H 57/0423* (2013.01); *F16H 57/0483* (2013.01); *F16H 57/0495* (2013.01); *B60K 17/344* (2013.01); *B60Y 2200/25* (2013.01); *B62D 55/065* (2013.01); *F16H 57/037* (2013.01); *F16H 57/0441* (2013.01)

(56) References Cited

U.S. PATENT DOCUMENTS

| | | |
|---|---|---|
| 3,505,904 A | 4/1970 | Williams, Jr. |
| 4,278,151 A | 7/1981 | Kessinger, Jr. |
| 4,286,478 A | 9/1981 | Kessinger, Jr. |
| 5,052,727 A | 10/1991 | Venable |
| 5,095,997 A | 3/1992 | Warner et al. |
| 5,145,241 A | 9/1992 | Baylor |
| 5,165,765 A | 11/1992 | Baylor |
| 5,186,295 A | 2/1993 | Frisbee et al. |
| 5,207,489 A | 5/1993 | Miller |
| 5,348,515 A | 9/1994 | Miller |
| 5,899,542 A | 5/1999 | Lykken et al. |
| 5,899,543 A | 5/1999 | Lykken et al. |
| 5,924,503 A | 7/1999 | Lykken |
| 6,016,713 A | 1/2000 | Hale |
| 6,065,365 A | 5/2000 | Ostler et al. |
| 6,116,362 A | 9/2000 | Schubert et al. |
| 6,176,334 B1 | 1/2001 | Lorenzen |
| 6,213,034 B1 | 4/2001 | Raducha et al. |
| 6,213,490 B1 | 4/2001 | Lykken et al. |
| 6,216,797 B1 | 4/2001 | Draney et al. |
| 6,318,484 B2 | 11/2001 | Lykken et al. |
| 6,361,093 B2 | 3/2002 | Garberg |
| 6,374,933 B1 | 4/2002 | Ruppert, Jr. et al. |
| 6,401,847 B1 | 6/2002 | Lykken |
| 6,866,605 B2 * | 3/2005 | Fabry ..................... B62D 11/16 475/160 |
| 7,326,142 B2 * | 2/2008 | Asahi .................... F16H 57/029 475/160 |
| 7,798,260 B2 | 9/2010 | Albright et al. |
| 10,183,710 B2 | 1/2019 | Zuidberg |
| 10,197,152 B2 | 2/2019 | Volkmer |
| 10,737,721 B2 * | 8/2020 | Vik ........................ B62D 11/20 |
| 2004/0000450 A1 | 1/2004 | Fabry |
| 2005/0072617 A1 | 4/2005 | Gady et al. |
| 2006/0100053 A1 | 5/2006 | Asahi et al. |
| 2015/0159746 A1 | 6/2015 | Volkmer et al. |
| 2016/0325793 A1 | 11/2016 | Zuidberg |
| 2018/0118262 A1 | 5/2018 | Vik |
| 2019/0023072 A1 | 1/2019 | Lubben et al. |

OTHER PUBLICATIONS

Winters Performance Products, Inc., Hot Rod Rears Catalog, Copyright 2018. (44 pages.).

German Search Report for Application No. 102018209905.7 dated Jan. 24, 2019. (14 pages).

USPTO office action dated Mar. 8, 2019 for U.S. Appl. No. 15/655,733. (40 pages).

\* cited by examiner

HIGH TRACK DRIVE SYSTEM FOR TRACK WORK VEHICLE

CROSS-REFERENCE TO RELATED APPLICATION(S)

This application is a continuation of U.S. application Ser. No. 15/655,733, filed Jul. 20, 2017, now allowed.

STATEMENT OF FEDERALLY SPONSORED RESEARCH OR DEVELOPMENT

Not applicable.

FIELD OF THE DISCLOSURE

This disclosure relates to work vehicles, and particularly to track work vehicles having an elevated track drive system.

BACKGROUND OF THE DISCLOSURE

Various work vehicles, such as tractors, include tracks that provide additional traction to enable the tractors to more easily move through rough or muddy fields. These tracks are driven by drive wheels. In certain instances, the drive wheels are driven such that a centerline of each of the track drive wheels is at the same elevation as a drive axle shaft of the tractor. In other instances, in order to improve performance, a gear set is coupled to the drive wheel external to a differential gear case to raise an elevation of a drive axle shaft to drive the drive wheels at a higher elevation. This requires an external gear set for each of the drive wheels, which increases part count and a weight of the track work vehicle. In addition, the multiple gear sets each require maintenance, which may reduce the productivity of the track work vehicle.

SUMMARY OF THE DISCLOSURE

The disclosure provides a track work vehicle having a high track drive system within a differential housing that elevates a portion of a drivetrain to an axis that is coaxial with a centerline of a drive wheel.

In one aspect, the disclosure provides a track work vehicle. The track work vehicle includes an axle input shaft defining a first axis of rotation, and a differential gear case having at least one planetary gear set. The track work vehicle includes a track drive system contained, at least in part, in the differential gear case. The track drive system includes a first gear coupled to the axle input shaft and a second gear coupled to the first gear. The track drive system includes a bevel gear assembly coupled to the second gear and a bevel gear set coupled to the at least one planetary gear set. The track work vehicle includes at least one drive axle shaft coupled to the at least one planetary gear set and a drive wheel for driving a continuous ground-engaging track. The at least one drive axle shaft has a second axis of rotation that is vertically offset from the first axis of rotation and substantially coaxial with a centerline of the drive wheel.

In another aspect the disclosure provides a track work vehicle. The track work vehicle includes an axle input shaft defining a first axis of rotation, and a differential gear case having at least one planetary gear set. The track work vehicle includes a track drive system contained, at least in part, in the differential gear case. The track drive system includes a first gear coupled to the axle input shaft and a second gear coupled to the first gear. The track drive system includes a bevel gear assembly coupled to the second gear and a bevel gear set coupled to the at least one planetary gear set. The track drive system includes a ring gear coupled to the bevel gear set and to the bevel gear assembly. The track work vehicle includes at least one drive axle shaft coupled to the at least one planetary gear set and a drive wheel for driving a continuous ground-engaging track. The at least one drive axle shaft has a second axis of rotation that is vertically offset from the first axis of rotation and substantially coaxial with a centerline of the drive wheel.

In yet another aspect the disclosure provides a track work vehicle. The track work vehicle includes an axle input shaft defining a first axis of rotation and a differential gear case having at least one planetary gear set. The track work vehicle includes a track drive system contained, at least in part, in the differential gear case. The track drive system includes a first gear coupled to the axle input shaft and a second gear coupled to the first gear. The track drive system includes a bevel gear assembly having a shaft and a bevel gear. The shaft is coupled to the second gear. The track drive system includes a bevel gear set coupled to the at least one planetary gear set and a ring gear coupled to the bevel gear set and to the bevel gear. The track work vehicle includes at least one drive axle shaft coupled to the at least one planetary gear set and a drive wheel coupled to the at least one drive axle shaft for driving a continuous ground-engaging track. The at least one drive axle shaft has a second axis of rotation that is vertically offset from the first axis of rotation and substantially coaxial with a centerline of the drive wheel.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
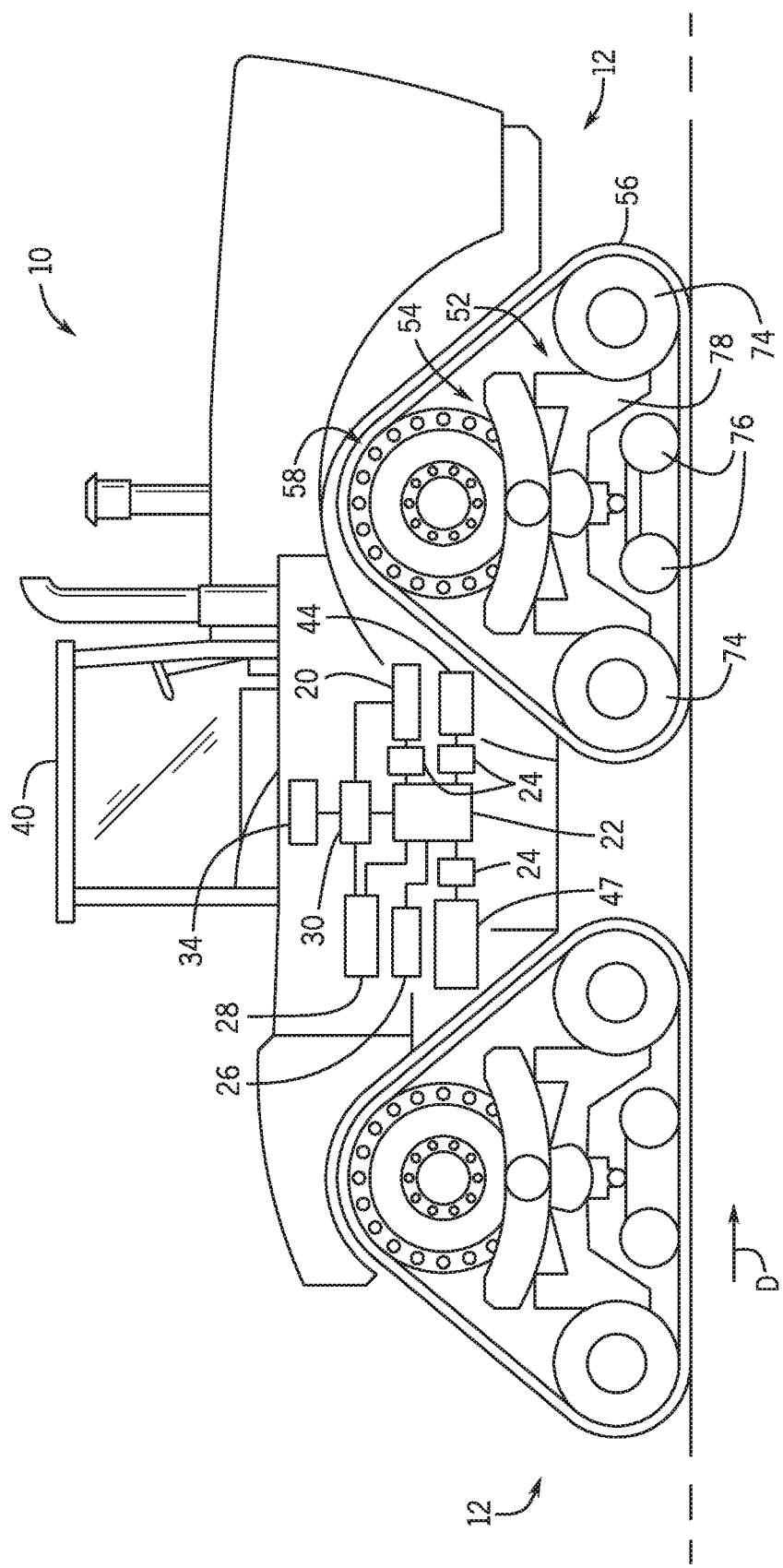
FIG. 1 is a side view of an example track work vehicle in the form of an agricultural tractor, which includes a high track drive system according to various embodiments of this disclosure.

The following describes one or more example embodiments of the disclosed high track drive system, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "axial" refers to a direction that is generally parallel to an axis of rotation, axis of symmetry, or centerline of a component or components. For example, in a cylinder or disc with a centerline and opposite, generally circular ends or faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction.

The following describes one or more example implementations of the disclosed system for a high track drive system for a track work vehicle, as shown in the accompanying figures of the drawings described briefly above. Generally, the disclosed systems (and work vehicles in which they are implemented) provide for elevating a drive axle shaft associated with a respective drive wheel to an elevation that is above an elevation associated with a transmission output drive shaft or axle input shaft of the track work vehicle within a differential gear case associated with the track work vehicle. This enables the drive wheels to be driven at a higher elevation, while reducing a part count and weight associated with the elevation change, and while also reducing cost and improving productivity of the work vehicle.

The following description relates to a work vehicle as a tractor. Discussion herein may sometimes focus on the example application of a tractor having a high track drive system that is raises an axis of rotation of a drive axle shaft. It should be noted, however, that the present disclosure is not limited to the track work vehicle, but rather, the high track drive system may be applied to a differential associated with any type of work vehicle.

In the example of the present disclosure, the high track drive system is contained wholly within the differential gear case and includes a first spur gear, a second spur gear, a bevel gear assembly and a bevel gear set. The first spur gear is coupled to the drive axle shaft, such as a rear axle of the track work vehicle, and the first spur gear is coupled to the second spur gear. The first spur gear and the second spur gear are each supported for rotation by a gear housing. The second spur gear is coupled to the bevel gear assembly, and a bevel gear of the bevel gear assembly drives a ring gear. The ring gear, in turn, is coupled to the bevel gear set, and drives the bevel gear set. The bevel gear set is coupled to a pair of planetary gear sets, which in turn, are coupled to the drive axle shafts that drive a pair of drive wheels.

As the second spur gear is stacked or coupled vertically above the first spur gear for rotation thereby, the second spur gear cooperates with the bevel gear assembly to raise an elevation of the drive axle shafts such that the drive axle shafts are coaxial with a centerline of the drive wheels, but offset from an axis of rotation of the axle input shaft.

As noted above, the system described herein may be employed with respect to a variety of work vehicles, including various agricultural or other work vehicles. In certain embodiments, the described system may be implemented with respect to a tractor. It will be understood, however, that the system disclosed herein may be used with various other work vehicles, such as a graders, excavators, etc. Referring to FIG. 1, a track work vehicle, such as a tractor 10, is shown. The tractor 10 includes a plurality of track systems 12, and a source of propulsion, such as an engine 20. The engine 20 supplies power to a transmission 22. As will be discussed, the transmission 22 transfers the power from the engine 20 to a suitable driveline 24 coupled to one or more of the track systems 12 of the tractor 10 to enable the tractor 10 to move. In one example, the engine 20 is an internal combustion engine, such as a diesel engine, that is controlled by an engine control module. It should be noted that the use of an internal combustion engine is merely exemplary, as the propulsion device can be a fuel cell, electric motor, a hybrid-electric motor, etc.

The tractor 10 also includes one or more pumps 26, which may be driven by the engine 20 of the tractor 10. Flow from the pumps 26 may be routed through various control valves 28 and various conduits (e.g., flexible hoses and lines) to control various components associated with the tractor 10. Flow from the pumps 26 may also power various other components of the tractor 10. The flow from the pumps 26 may be controlled in various ways (e.g., through control of the various control valves 28 and/or a controller 30 associated with the tractor 10). As will be discussed herein, flow from the pumps 26 may be routed through one or more of the control valves 28 and various conduits to lubricate a portion of a differential gear case 48.

Generally, the controller 30 (or multiple controllers) may be provided, for control of various aspects of the operation of the tractor 10, in general. The controller 30 (or others) may be configured as a computing device with associated processor devices and memory architectures, as a hard-wired computing circuit (or circuits), as a programmable circuit, as a hydraulic, electrical or electro-hydraulic controller, or otherwise. As such, the controller 30 may be configured to execute various computational and control functionality with respect to the tractor 10 (or other machinery). In some embodiments, the controller 30 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 30 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 30 may be in electronic, hydraulic, mechanical, or other communication with various other systems or devices of the tractor 10 (or other machinery, such as an implement coupled to the tractor 10). For example, the controller 30 may be in electronic or hydraulic communication with various actuators, sensors, and other devices within (or outside of) the tractor 10, including various devices associated with the pumps 26, control valves 28, and so on. The controller 30 may communicate with other systems or devices (including other controllers, such as a controller associated with an implement) in various known ways, including via a CAN bus (not shown) of the tractor 10, via wireless or hydraulic communication means, or otherwise.

Various sensors may also be provided to observe various conditions associated with the tractor 10. In some embodiments, various sensors 34 (e.g., pressure, flow or other sensors) may be disposed near the pumps 26 and control valves 28, or elsewhere on the tractor 10. For example, sensors 34 observe a pressure associated with the pumps 26 and generate sensor signals based thereon.

The tractor 10 also includes a cab 40, which includes a human-machine interface. The controller 30 receives input commands and interfaces with the operator via the human-machine interface 42.

Figure 1A:
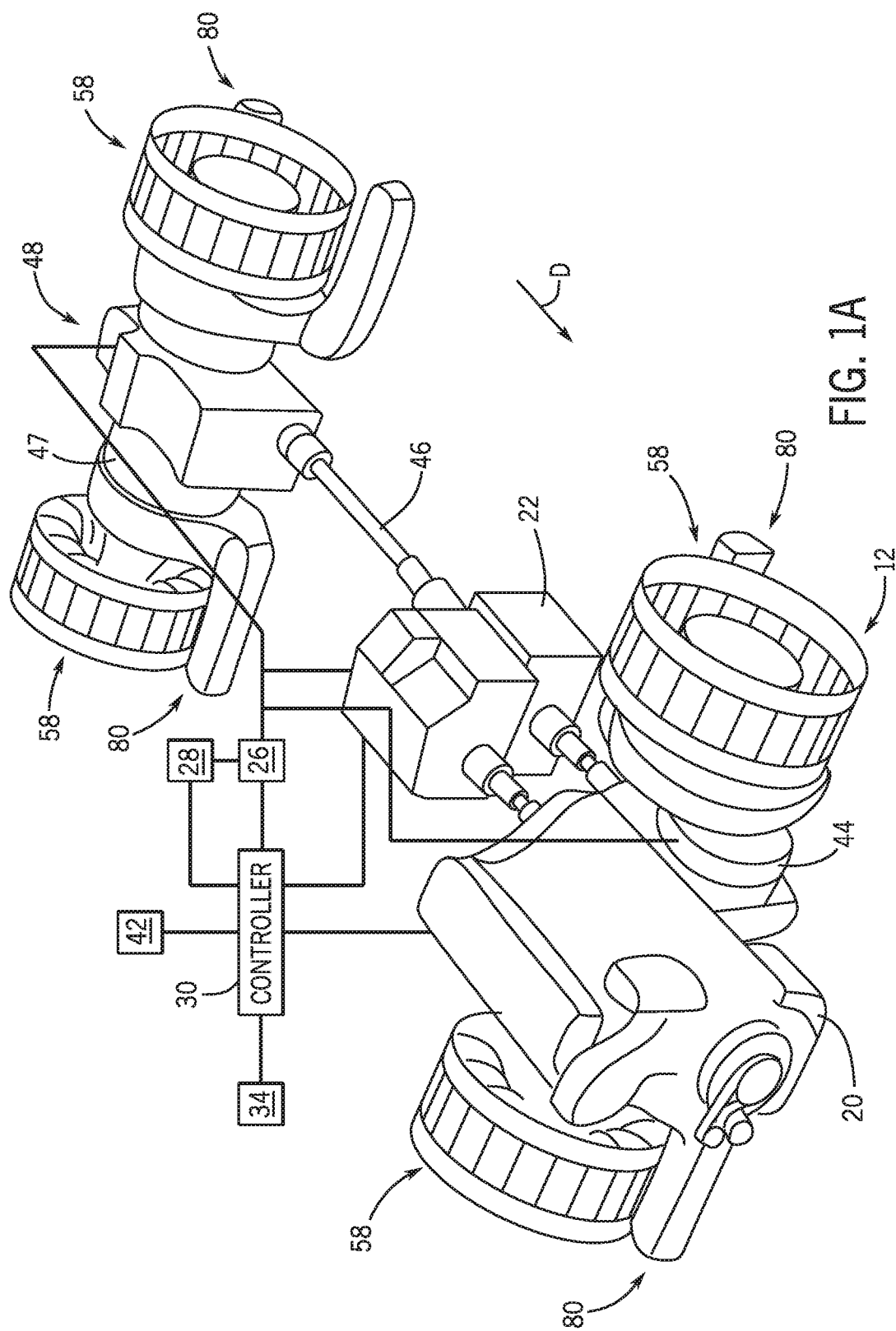
FIG. 1A is a schematic perspective view of a drivetrain for the track work vehicle of FIG. 1, with a portion of each saddle assembly omitted for clarity.

As illustrated in FIG. 1A, the tractor 10 includes a pair of the track systems 12 associated with a first or front axle assembly 44 of the tractor 10 in a forward driving direction D, and a pair of track systems 12 associated with a transmission output shaft or drive shaft lower 49 of the tractor 10 (only a portion of the track systems 12 are illustrated in FIG. 1A for clarity), which is coupled to an axle input shaft 46 of a second or rear axle assembly 47. It should be noted that while the tractor 10 is illustrated herein as comprising the plurality of track systems 12, it will be understood that the tractor 10 can include any number of track systems 12, such as one or two. The pair of track systems 12 associated with the axle input shaft 46 of the tractor 10 are each coupled to the differential gear case 48, which receives input torque from the transmission 22 via the axle input shaft 46.

In this example, with reference to FIG. 1, each of the track systems 12 includes an undercarriage assembly 52, a saddle assembly 54, a track 56 and a drive wheel 58. The drive wheel 58 is fastened to a drive axle shaft 72 and supported by an axle housing 60. The drive wheel 58 is annular, and defines an outer circumference 62 and a drive wheel hub 64. Generally, the drive wheel 58 is composed of a metal or metal alloy, which is cast as one integral piece. It will be understood, however, that the drive wheel 58 can be composed of multiple pieces that are welded or otherwise fastened together. The outer circumference 62 defines a plurality of track guides 66 (FIG. 2) substantially continuously about a perimeter. In this example, the plurality of track guides 66 comprises a plurality of slots, which are spaced substantially evenly about the perimeter of the outer circumference 62 to transfer torque from the drive wheel 58 to the track 56. Generally, the plurality of track guides 66 each receive a respective one of a plurality of teeth (not shown) of the track 56 to drive the track 56 with the drive wheel 58.

Figure 3:
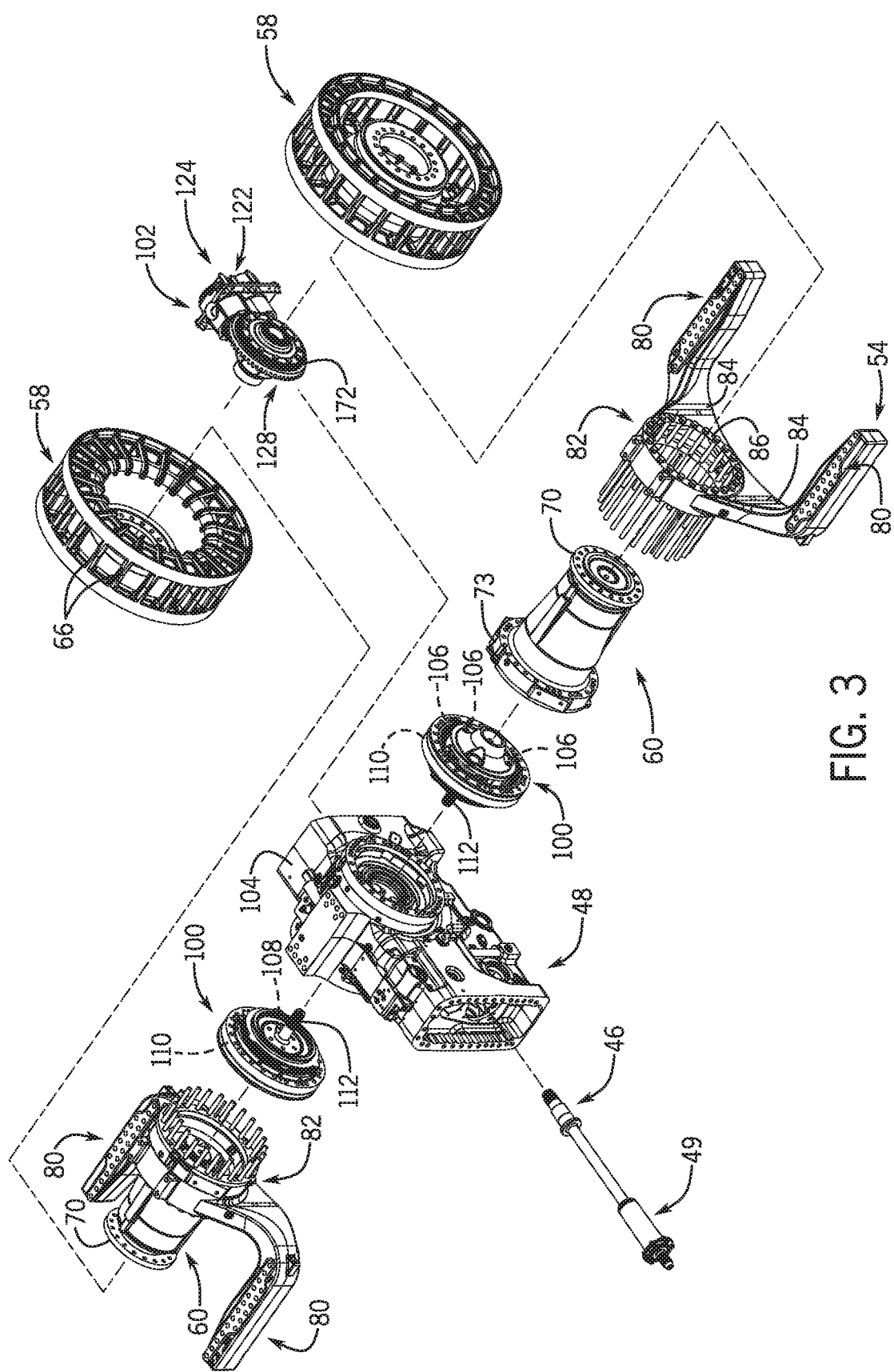
FIG. 3 is a partially exploded view of FIG. 2.
Figure 4:
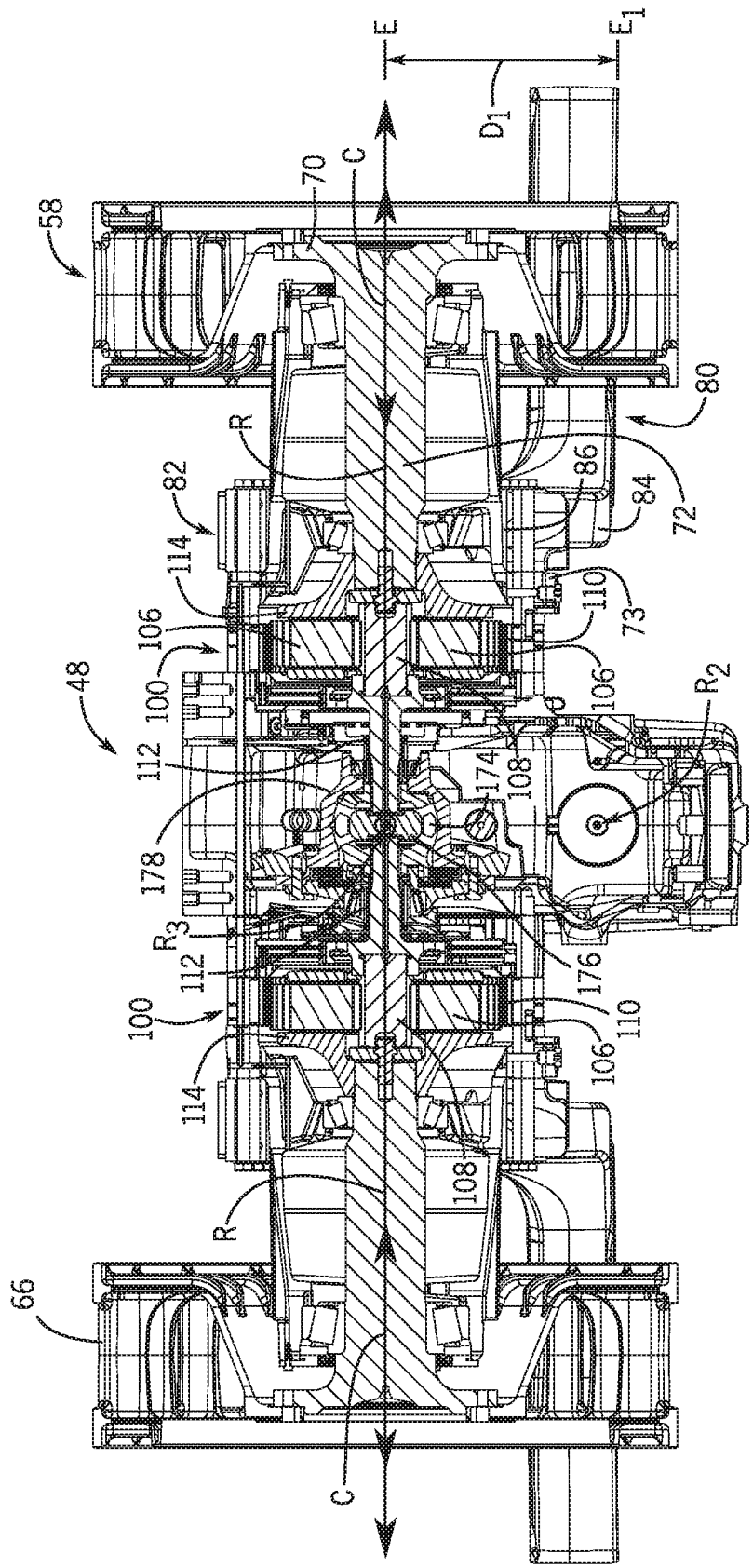
FIG. 4 is a cross-sectional view of the differential gear case and the portion of the track drive system of FIG. 2, taken along line 4-4 of FIG. 2.

The drive wheel hub 64 couples the drive wheel 58 to the axle housing 60. Generally, the drive wheel hub 64 defines one or more bores that receive a respective one of one or more mechanical fasteners to couple the drive wheel 58 to an axle flange 70 associated with the axle housing 60. With reference to FIG. 3, the axle housing 60 is substantially cylindrical and substantially encloses the drive axle shaft 72 (FIG. 4), which is coupled to the axle flange 70. In one example, the drive axle shaft 72 is integrally formed with the drive axle shaft 72. The axle flange 70 extends from the axle housing 60 to enable the rotation of the drive wheel 58 relative to the axle housing 60. With reference to FIG. 4, the axle flange 70 is coupled to drive wheel hub 64 of the drive wheel 58 such that torque from the drive axle shaft 72 is transmitted to the drive wheel 58 to drive the drive wheel 58. As will be discussed further herein, the drive axle shaft 72 is coupled to the differential gear case 48 to receive input torque. The axle housing 60 also includes a flange 73, which couples the saddle assembly 54 to the axle housing 60. As shown in FIG. 3, the flange 73 extends about a perimeter or circumference of the axle housing 60 at an end of the axle housing 60 that is substantially opposite an end of the axle housing 60 that is near or adjacent to the axle flange 70.

With reference back to FIG. 1, in one example, the undercarriage assembly 52 is movably or pivotally coupled to the saddle assembly 54. The undercarriage assembly 52 is not coupled to the drive wheel 58. Generally, the undercarriage assembly 52 includes a plurality of first idler wheels 74 and a plurality of bogey or second idler wheels 76, which are each supported for rotation relative to an undercarriage frame 78. In this example, the undercarriage assembly 52 includes two pairs of first idler wheels 74, and two pairs of second idler wheels 76. Each of the first idler wheels 74 and second idler wheels 76 cooperate to guide the track 56 along the ground as it is driven by the drive wheel 58. It should be noted that this configuration of idler wheels 74, 76 is merely exemplary, as any number and arrangement of idler wheels may be employed.

Figure 2:
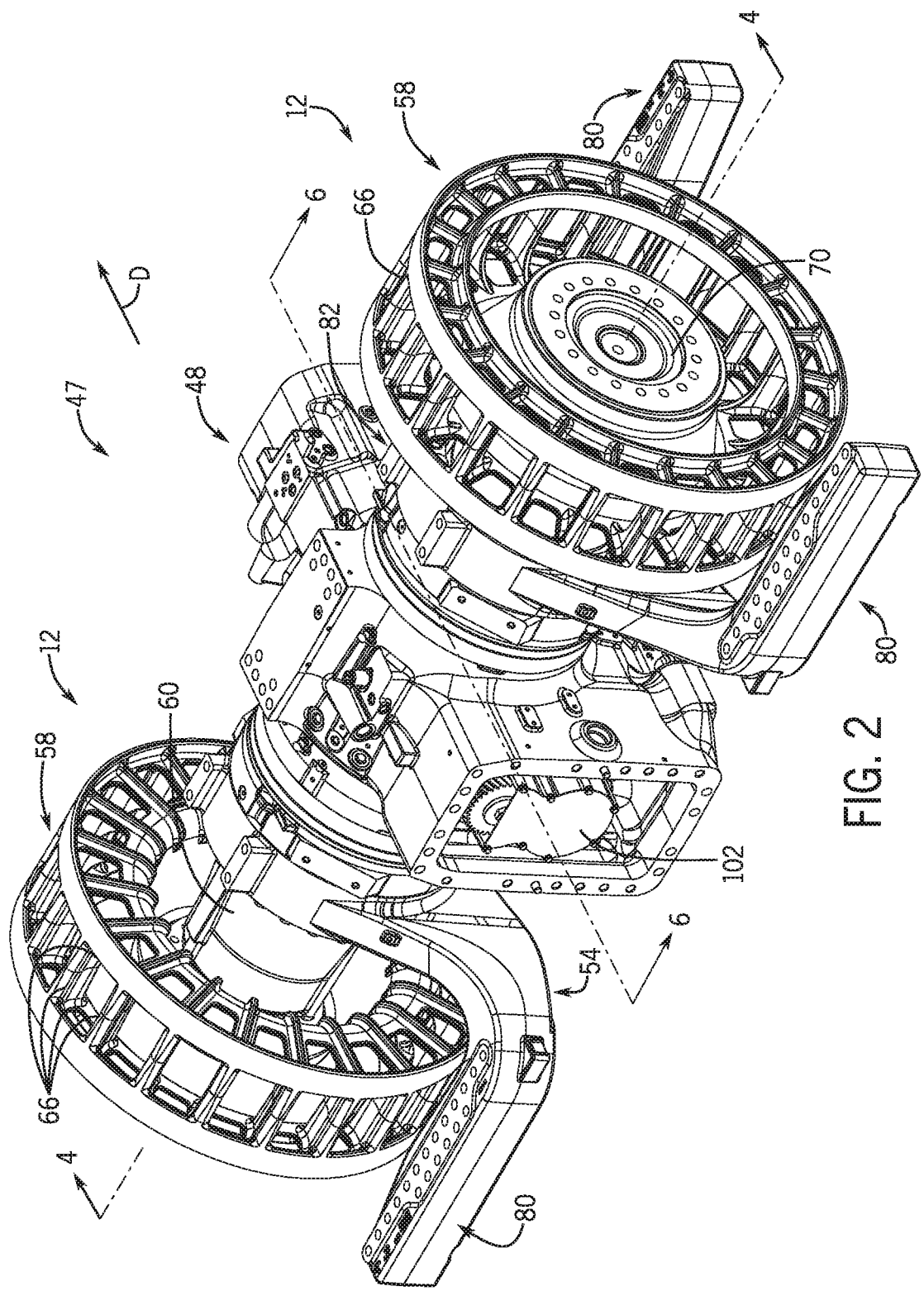
FIG. 2 is a perspective view of a differential gear case and a portion of the track drive system of the work vehicle of FIG. 1, which illustrates the high track drive system coupled to the differential gear case.

The saddle assembly 54 includes a pair of arms 80 that each extend outwardly from an annular base 82. With reference to FIG. 2, each of the arms 80 extend outwardly from the base 82 so as to be positioned on opposing sides of the drive wheel 58. The arms 80 each guide the track 56 as the track 56 moves about the drive wheel 58. With reference to FIG. 3, the arms 80 may each include a flange 84, which couples the respective arm 80 to the base 82. The flange 84 may be curved to facilitate placement of the arms 80 about the drive wheel 58.

The base 82 defines a central bore 86, which enables the saddle assembly 54 to be removably coupled to the axle housing 60. By removably coupling the saddle assembly 54 to the axle housing 60, the saddle assembly 54 may be easily removed for maintenance or repairs. The base 82 defines a plurality of through-bores about a circumference of the bore 86, which receive a respective one of one or more mechanical fasteners to couple the base 82 to the flange 73 of the axle housing 60.

With reference back to FIG. 1, the track 56 is continuous, and is received about a perimeter of the drive wheel 58 and the undercarriage assembly 52. Generally, the track 56 is tensioned about the drive wheel 58 and the undercarriage assembly 52. In this example, the track 56 is composed of a polymeric material; however, the track 56 can be composed of a metal or metal alloy. An exterior surface of the track 56 includes a plurality of projections or treads (not shown), which project from the exterior surface to engage the terrain over which the tractor 10 travels. An interior surface includes the plurality of teeth (not shown) that extend outwardly from the interior surface to engage the drive wheel 58, the first idler wheels 74 and the second idler wheels 76 to move or drive the track 56 about the perimeter of the drive wheel 58 and the undercarriage assembly 52.

With reference to FIG. 2, the pair of track systems 12 associated with the axle input shaft 46 are each coupled to the differential gear case 48. The differential gear case 48 is coupled to a frame of the tractor 10. The differential gear case 48 receives input torque from the transmission 22 via the axle input shaft 46. The differential gear case 48 includes a pair of final drive gear sets or planetary gear sets 100 and a high track drive system 102. The planetary gear sets 100 are each generally received within a differential case or housing 104 of the differential gear case 48, and the high track drive system 102 is also received within the housing 104. The high track drive system 102 is lubricated by a lubrication fluid supplied by a lubrication system 200, as will be discussed further herein.

Generally, with reference to FIG. 3, the planetary gear sets 100 receive as input torque from the high track drive system 102. The planetary gear sets 100 increase the received torque and transmit the increased torque to the drive axle shaft 72. In this example, each of the planetary gear sets 100 include three planet gears 106, which are driven by a sun gear 108 about a ring gear 110. The sun gear 108 is coupled to a sun input shaft 112. With reference to FIG. 4, a planetary carrier 114 supports the planet gears 106 and is coupled to an end of the drive axle shaft 72.

As shown in FIG. 4, an axis of rotation R of the drive axle shaft 72 is coaxial with a centerline C of the drive wheel 58, and is offset from an axis of rotation R2 of the axle input shaft 46. The high track drive system 102 receives the input torque from the axle input shaft 46 and raises the input torque to an axis of rotation R3, which is generally transverse to and substantially intersects the axis of rotation R of the drive axle shaft 72. The high track drive system 102 enables the drive axle shafts 72 to be driven at an elevation E, which is above or greater than an elevation E1 of the axle input shaft 46 of the tractor 10 (FIG. 1). A distance D1 is defined between the elevation E and the elevation E1, which is greater than zero. Thus, the axis of rotation R of the drive axle shaft 72 is vertically offset from the axis of rotation R2 of the axle input shaft 46.

Figure 5:
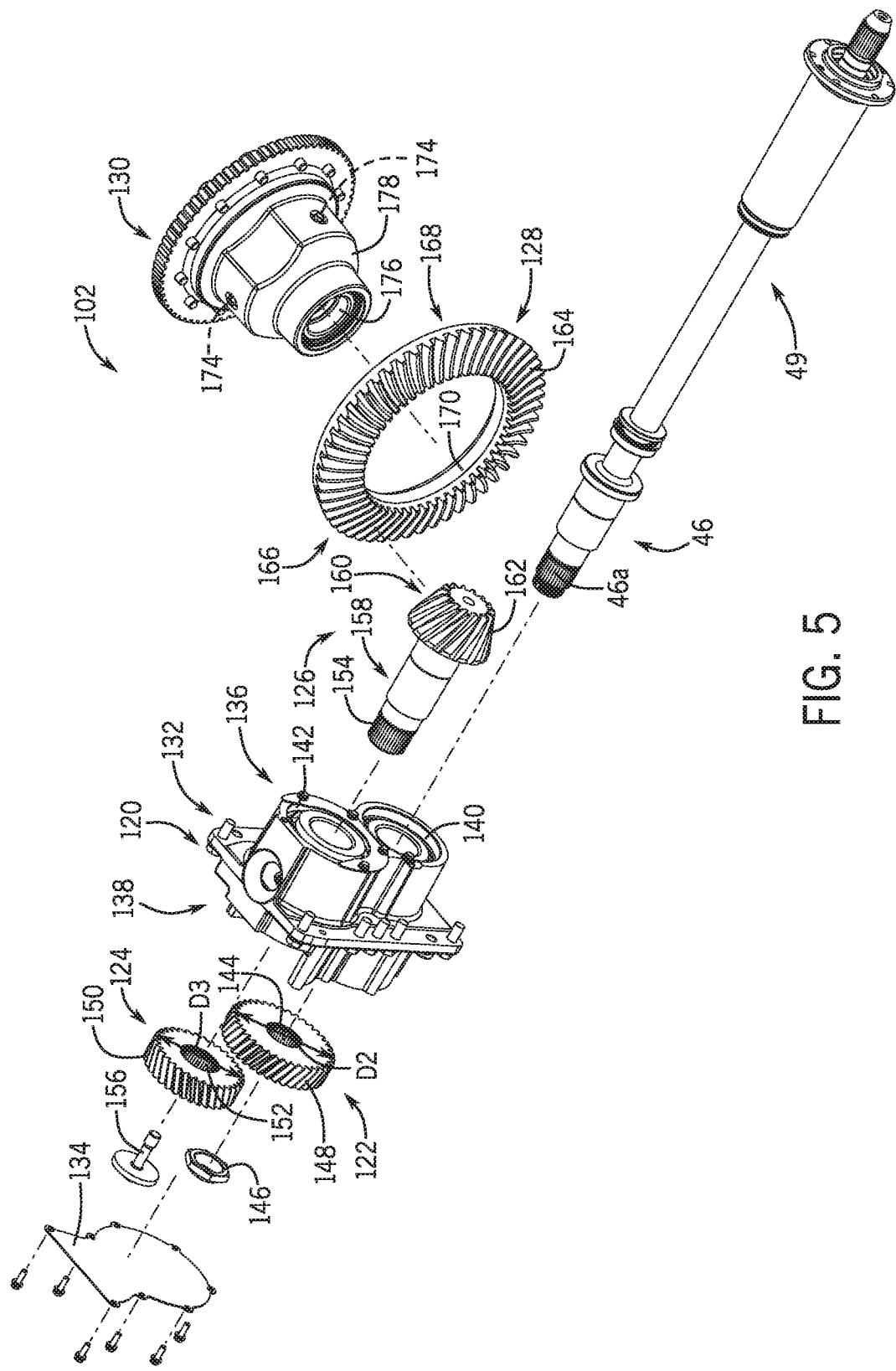
FIG. 5 is an exploded view of the high track drive system of FIG. 1.

With reference to FIG. 5, the high track drive system 102 is shown in greater detail. The high track drive system 102 includes a gear housing 120, a first spur gear 122, a second spur gear 124, a bevel gear assembly 126, a ring gear 128 and a bevel gear set 130. The gear housing 120 is composed of a metal or metal alloy, and may composed of multiple pieces that are cast, machined, stamped, etc. and assembled to define the gear housing 120. The gear housing 120 supports the first spur gear 122, the second spur gear 124 and the bevel gear 160 for rotation. The gear housing 120 also supports a portion of the axle input shaft 46. The gear housing 120 includes main housing 132 and a back plate 134. The main housing 132 has a first side 136 and a second, opposite side 138, with a first chamber 140 and a second chamber 142 defined through the main housing 132 from the first side 136 to the second side 138. The back plate 134 is coupled to the second side 138, via one or more mechanical fasteners, to enclose the gear housing 120.

Figure 6:
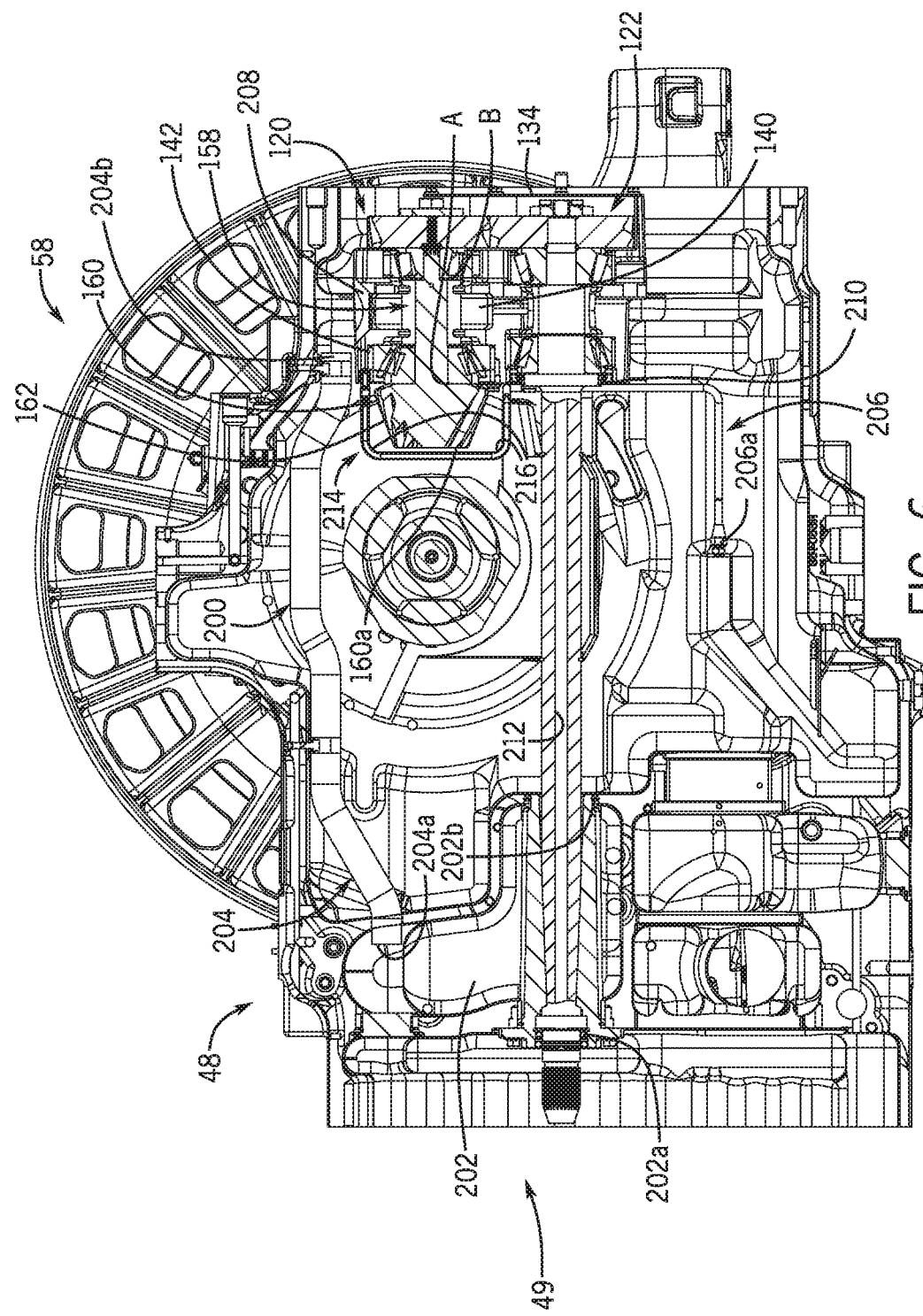
FIG. 6 is a cross-sectional view of the differential gear case and the portion of the track drive system of FIG. 2, taken along line 6-6 of FIG. 2.

With reference to FIG. 6, on the first side 136, the first chamber 140 receives the axle input shaft 46, which is supported for rotation by one or more bearings contained within the first chamber 140. On the second side 138, the first chamber 140 receives the first spur gear 122. The second chamber 142 is spaced vertically apart from the first chamber 140. On the first side 136, the second chamber 142 receives the bevel gear assembly 126, which is supported for rotation by one or more bearings contained within the second chamber 142. On the second side 138, the second chamber 142 receives the second spur gear 124, which is rotatably coupled to the first spur gear 122. As will be discussed, the gear housing 120 also cooperates with the lubrication system 200 associated with the high track drive system 102.

With reference back to FIG. 5, the first spur gear 122 includes a central bore 144. A spline may be defined on an interior of the bore 144 for coupling to a spline 46a of the axle input shaft 46 to the first spur gear 122. A nut, which threadably engages a portion of the axle input shaft 46 near the spline 46a, may be employed to further couple the axle input shaft 46 to the first spur gear 122. The first spur gear 122 is coupled to the axle input shaft 46 such that the first spur gear 122 rotates with or is driven by the axle input shaft 46. The first spur gear 122 is composed of a metal or metal alloy, and is stamped, machined, cast, etc. The first spur gear 122 has a diameter D2, which is different than a diameter D3 of the second spur gear 124. In this example, the diameter D2 is greater than the diameter D3. The first spur gear 122 defines a plurality of gear teeth 148 about a perimeter or outer circumference of the first spur gear 122. The plurality of gear teeth 148 meshingly engage with a plurality of gear teeth 150 of the second spur gear 124.

The second spur gear 124 defines the plurality of gear teeth 150 about a perimeter or outer circumference of the second spur gear 124. The plurality of gear teeth 150 meshingly engage with a plurality of gear teeth 148 such that the first spur gear 122 drives the second spur gear 124. The second spur gear 124 defines a central bore 152. A spline may be defined on an interior of the bore 152 for coupling to a spline 154 of the bevel gear assembly 126. A bolt and washer 156 may be received within the bore 152 to assist in coupling the bevel gear assembly 126 to the second spur gear 124. The second spur gear 124 is composed of a metal or metal alloy, and is stamped, machined, cast, etc. The second spur gear 124 is coupled to the bevel gear assembly 126 to drive the bevel gear assembly 126.

The bevel gear assembly 126 includes a pinion shaft 158 and a bevel gear 160. The pinion shaft 158 and the bevel gear 160 are each composed of a metal or metal alloy, and are each stamped, machined, cast, etc. The pinion shaft 158 may be formed discrete from the bevel gear 160, and coupled together via a suitable post processing step or may be integrally formed. The pinion shaft 158 includes the spline 154. The pinion shaft 158 is received within the second chamber 142, and is supported for rotation within the second chamber 142 by the one or more bearings. An end of the pinion shaft 158 opposite the spline 154 is coupled to the bevel gear 160.

The bevel gear 160 generally extends beyond the second chamber 142 of the gear housing 120 (FIG. 6). The bevel gear 160 defines a plurality of bevel gear teeth 162 about a perimeter or outer circumference of the bevel gear 160. The bevel gear teeth 162 meshingly engage with a plurality of bevel gear teeth 164 defined on the ring gear 128. Generally, each of the bevel gear teeth 162, 164 are spiral bevel gear teeth, however, the bevel gear teeth 162, 164 may comprise hypoid bevel gear teeth. The bevel gear 160 drives the ring gear 128.

The ring gear 128 includes a first face 166 opposite a second face 168 and a central bore 170. The ring gear 128 is composed of a metal or metal alloy, and is stamped, machined, cast, etc. The plurality of bevel gear teeth 164 are defined on the first face 166. The plurality of bevel gear teeth 164 are defined about the first face 166 such that the plurality of bevel gear teeth 164 surround or circumscribe the bore 170. The second face 168 is substantially planar, and is coupled to the bevel gear set 130. A portion of the bevel gear set 130 is also received through the bore 170. The rotation of the ring gear 128 drives the bevel gear set 130, which transfers torque to the sun input shafts 112 of the planetary gear sets 100.

The bevel gear set 130 includes a second set of three planet gears 174, a differential side gear 176 and a carrier housing 178. A plurality of teeth may be defined about the second face 168 of the ring gear 128 to be observable by a sensing device, such as a speed sensor, for example. With reference to FIG. 4, the second set of three planet gears 174 are coupled to the carrier housing 178. The movement of the carrier housing 178 drives the second set of planet gears 174. The second set of planet gears 174 each meshingly engage with the differential side gear 176. The differential side gear 176 is coupled to each of the sun input shafts 112. The movement of the second set of planet gears 174 drives the differential side gear 176, which in turn drives each of the sun input shafts 112.

The lubrication system 200 provides oil or other lubrication fluid to the high track drive system 102. In this example, the lubrication system 200 receives the oil from the one or more pumps 26 associated with the tractor 10 via one or more conduits (FIG. 1A). The lubrication system 200 cooperates with the gear housing 120 to lubricate the first spur gear 122, the second spur gear 124, the bevel gear assembly 126 and the axle input shaft 46. With reference to FIG. 6, the lubrication system 200 includes a clean oil reservoir 202, a quill lubrication tube or first oil conduit 204 and a spiral bevel lubrication tube or second oil conduit 206.

The clean oil reservoir 202 receives the oil from the pumps 26 and/or control valves 28 of the tractor 10 via one or more conduits (FIG. 1A). The clean oil reservoir 202 is continuously filled during the operation of the tractor 10, and once the clean oil reservoir 202 is filled with oil, the clean oil exits the clean oil reservoir 202 through the first oil conduit 204. The clean oil reservoir 202 is isolated from the remainder of the differential gear case 48 via one or more sealing elements, such as O-rings 202a, 202b.

The first oil conduit 204 is tubular, and directs the clean oil from the clean oil reservoir 202 to the gear housing 120. The first oil conduit 204 includes an inlet 204a in fluid communication with the clean oil reservoir 202 and an outlet 204b. The outlet 204b is positioned substantially over the gear housing 120 within the differential gear case 48. The clean oil exits the first oil conduit 204 via the outlet 204b and enters into the gear housing 120 via a lubrication bore 208 defined in the gear housing 120. The lubrication bore 208 is in fluid communication with the second chamber 142 and is also in fluid communication with the first chamber 140. The clean oil received into the gear housing 120 via the lubrication bore 208 fills the gear housing 120 with the clean oil until the level of oil in the gear housing 120 reaches a predefined level. The back plate 134 retains the oil within the gear housing 120, and a seal 210 coupled to the first chamber 140 further retains the oil within the first chamber 140 to enable the gear housing 120 to fill with oil.

Once the oil in the gear housing 120 reaches the predefined level, the oil exits the gear housing 120 at point A and B near the bevel gear assembly 126. Air pressure in the gear housing 120 also exits via a hollow chamber 212 defined within the axle input shaft 46 and the drive shaft lower 49. The air flows through the axle input shaft 46 and the drive shaft lower 49 and returns to the transmission 22 (FIG. 1A) to equalize air pressure with atmosphere.

The second oil conduit 206 is in fluid communication with the pumps 26 and/or control valves 28 of the tractor 10 via one or more conduits to receive oil or other lubricating fluid. In this example, the second oil conduit 206 is distinct or separate from the clean oil reservoir 202 and the first oil conduit 204. The second oil conduit 206 receives clean oil at an inlet 206a. The second oil conduit 206 is tubular and directs the clean oil along the first side 136 of the gear housing 120. Downstream from the inlet 206a and along the first side 136 of the gear housing 120 adjacent to or near the second chamber 142, the second oil conduit 206 defines an outlet portion 214. The outlet portion 214 is substantially U-shaped so as to surround at least a portion of the bevel gear 160. The outlet portion 214 includes a plurality of holes 216, which are spaced apart along the second oil conduit 206 and orientated to direct oil onto a face 160a of the bevel gear 160, the bevel gear teeth 162 of the bevel gear 160 and onto the bevel gear teeth 164 of the ring gear 128. Stated another way, the second oil conduit 206 defines the plurality of holes 216 through the second oil conduit 206 to supply oil to the bevel gear assembly 126. In one example, the outlet portion 214 includes about 4 holes having about a 1.5 millimeter (mm) to about a 2.0 millimeter (mm) diameter.

With reference to FIG. 3, in order to assemble the differential gear case 48, the high track drive system 102 may be assembled and coupled to the differential gear case 48. In one example, with reference to FIG. 5, with the bevel gear 160 coupled to the pinion shaft 158, the pinion shaft 158 is inserted through the second chamber 142 and coupled to the second spur gear 124. The first spur gear 122 is coupled to the first chamber 140, and the back plate 134 is coupled to the gear housing 120 to retain the first spur gear 122, the second spur gear 124 and the oil or lubrication fluid within the gear housing 120. The ring gear 128 is coupled to the assembled bevel gear set 130, and the ring gear 128 is positioned such that the bevel gear teeth 162, 164 meshingly engage.

With reference to FIG. 6, with the high track drive system 102 assembled, the high track drive system 102 is positioned within the differential gear case 48. The axle input shaft 46 is inserted into the differential gear case 48 and coupled to the first spur gear 122. With the clean oil reservoir 202 defined within the differential gear case 48, the O-rings 202a, 202b may be coupled to the differential gear case 48 to seal the clean oil reservoir 202 from the environment. The first oil conduit 204 may be coupled to the differential gear case 48 such that the outlet 204b is aligned with the lubrication bore 208 of the gear housing 120. The second oil conduit 206 may be coupled to the differential gear case 48, and positioned such that the outlet portion 214 surrounds a portion of the face 160a of the bevel gear 160.

With reference to FIG. 4, with the planetary gear sets 100 assembled, the sun input shafts 112 are each coupled to the differential side gear 176 of the bevel gear set 130. The drive axle shafts 72 are each coupled to a respective one of the planetary carriers 114 of the planetary gear sets 100, and the axle housing 60 is coupled to the planetary gear sets 100 about the drive axle shafts 72. With reference to FIG. 3, a respective one of the saddle assemblies 54 is coupled to a respective one of the axle housings 60, and a respective one of the drive wheels 58 is coupled to a respective one of the axle flanges 70. With reference to FIG. 1, a respective one of the undercarriage assemblies 52 is coupled to a respective one of the saddle assemblies 54, and a respective one of the tracks 56 is positioned about a respective one of the drive wheels 58.

Figure 7:
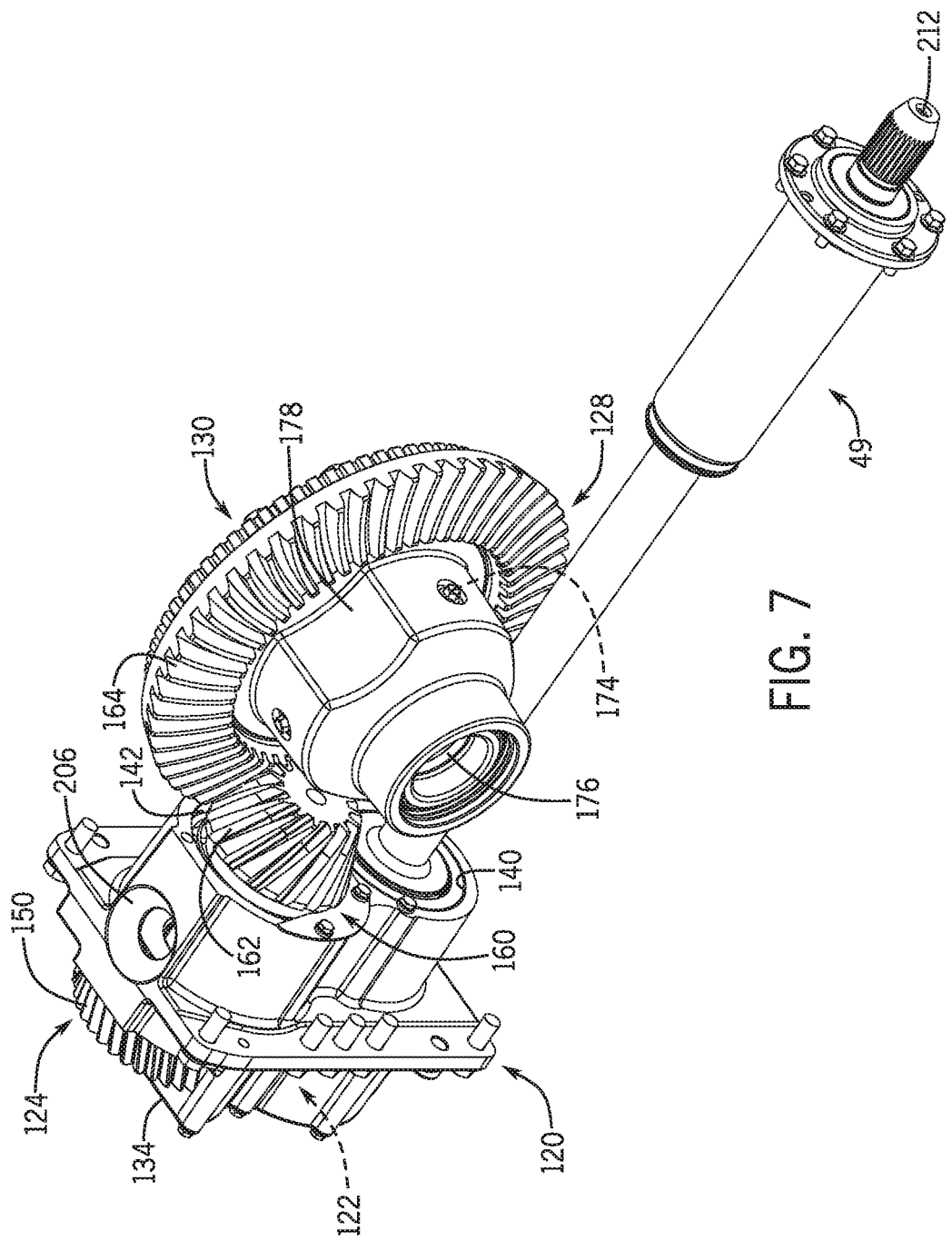
FIG. 7 is a perspective view of the high track drive system of FIG. 1.

With reference to FIG. 7, when the tractor 10 is in motion, torque is transmitted from the axle input shaft 46 into the high track drive system 102. The torque from the axle input shaft 46 drives the first spur gear 122, which in turn drives the second spur gear 124. The second spur gear 124 drives the bevel gear assembly 126, and the bevel gear 160 drives the ring gear 128. The ring gear 128 drives the bevel gear set 130. With reference to FIG. 4, the bevel gear set 130 drives the planetary gear sets 100, which in turn drive the drive axle shafts 72, and thus, the drive wheels 58. The axis of rotation R of the drive axle shafts 72 is coaxial with the centerline C of the drive wheels 58, which is spaced apart from the axis of rotation R2 of the axle input shaft 46 by the distance D1. Thus, the high track drive system 102 enables the drive axle shafts 72 and the drive wheels 58 to be driven at the elevation E that is greater than the elevation E1 of the axle input shaft 46.

In addition, while the tractor 10 is in operation, with reference to FIG. 6, the pumps 26 and/or control valves 28 supply clean oil to the clean oil reservoir 202. Once filled, the clean oil exits the clean oil reservoir 202 and flows through the first oil conduit 204 to enter the gear housing 120 via the lubrication bore 208. The oil fills the gear housing 120 until the oil reaches the predefined level and exits through the point A and/or point B. In addition, the second oil conduit 206 supplies oil to the face 160a of the bevel gear 160 via the holes 216.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A track drive system for a work vehicle having a continuous ground-engaging track, the track drive system comprising:
    a first gear coupled to an axle input shaft defining a first axis of rotation;
    a second gear coupled to the first gear;
    a bevel gear assembly coupled to the second gear and defining a third axis of rotation;
    a bevel gear set coupled to at least one planetary gear set of a differential of the work vehicle;
    at least one drive axle shaft coupled to the at least one planetary gear set and defining a second axis of rotation; and
    a drive wheel for driving the continuous ground-engaging track, the drive wheel having a centerline;
    wherein the second axis of rotation of the at least one drive axle shaft is vertically offset from the first axis of rotation of the first gear and substantially coaxial with the centerline of the drive wheel and intersects the third axis of rotation of the bevel gear assembly.

2. The track drive system of claim 1, wherein the bevel gear assembly includes a shaft and a bevel gear, and the shaft is coupled to the second gear and extends substantially along the third axis of rotation.

3. The track drive system of claim 2, wherein the bevel gear is coupled to a ring gear, and the ring gear is coupled to the bevel gear set to drive the bevel gear set and to drive the at least one planetary gear set.

4. The track drive system of claim 1, further comprising a gear housing having a first side and a second side, with a first chamber and a second chamber each defined from the first side to the second side, and the first gear and the second gear are coupled to the second side.

5. The track drive system of claim 4, wherein the first gear is coupled to the first chamber, and the axle input shaft is received into the first chamber at the first side to couple the axle input shaft to the first gear.

6. The track drive system of claim 4, wherein the second gear is coupled to the second chamber, and the bevel gear assembly is received into the second chamber at the first side to couple the bevel gear assembly to the second gear.

7. The track drive system of claim 1, further including a gear housing supplied with lubrication through a first conduit of a lubrication system.

8. The track drive system of claim 7, wherein the bevel gear assembly is supplied with lubrication through a second conduit of the lubrication system having an outlet portion with a plurality of holes.

9. The track drive system of claim 1, wherein the at least one drive axle is substantially enclosed by at least one axle housing shaft and at least one saddle that supports the continuous ground-engaging track.

10. A track drive system for a work vehicle having a continuous ground-engaging track, the track drive system comprising:
    a first gear coupled to an axle input shaft defining a first axis of rotation;
    a second gear coupled to the first gear;
    a bevel gear assembly coupled to the second gear and defining a third axis of rotation;
    a bevel gear set coupled to at least one planetary gear set of a differential of the work vehicle;
    a ring gear coupled to the bevel gear set and to the bevel gear assembly;
    at least one drive axle shaft coupled to the at least one planetary gear set and defining a second axis of rotation; and
    a drive wheel for driving the continuous ground-engaging track, the drive wheel having a centerline;
    wherein the second axis of rotation of the at least one drive axle shaft is vertically offset from the first axis of rotation of the first gear and substantially coaxial with the centerline of the drive wheel and intersects the third axis of rotation of the bevel gear assembly.

11. The track drive system of claim 10, wherein the bevel gear assembly includes a shaft and a bevel gear, and the shaft is coupled to the second gear and extends substantially along the third axis of rotation.

12. The track drive system of claim 10, further comprising a gear housing having a first side and a second side, with a first chamber and a second chamber each defined from the first side to the second side, and the first gear and the second gear are coupled to the second side.

13. The track drive system of claim 12, wherein the first gear is coupled to the first chamber, and the axle input shaft is received into the first chamber at the first side to couple the axle input shaft to the first gear.

14. The track drive system of claim 13, wherein the second gear is coupled to the second chamber, and the bevel gear assembly is received into the second chamber at the first side to couple the bevel gear assembly to the second gear.

15. The track drive system of claim 10, further including a gear housing supplied with lubrication through a first conduit of a lubrication system.

16. The track drive system of claim 15, wherein the bevel gear assembly is supplied with lubrication through a second conduit of the lubrication system having an outlet portion with a plurality of holes.

17. The track drive system of claim 10, wherein the at least one drive axle is substantially enclosed by at least one axle housing shaft and at least one saddle that supports the continuous ground-engaging track.

18. A track drive system for a work vehicle having a continuous ground-engaging track, the track drive system comprising:
   a first gear coupled to an axle input shaft defining a first axis of rotation;
   a second gear coupled to the first gear;
   a bevel gear assembly having a shaft and a bevel gear, the shaft coupled to the second gear and extending substantially along a third axis of rotation;
   a bevel gear set coupled to at least one planetary gear set of a differential of the work vehicle;
   a ring gear coupled to the bevel gear set and to the bevel gear;
   at least one drive axle shaft coupled to the at least one planetary gear set and defining a second axis of rotation; and
   a drive wheel for driving the continuous ground-engaging track, the drive wheel having a centerline;
   wherein the second axis of rotation of the at least one drive axle shaft is vertically offset from the first axis of rotation of the first gear and substantially coaxial with the centerline of the drive wheel and intersects the third axis of rotation of the bevel gear assembly.

19. The track drive system of claim 18, further including a gear housing supplied with lubrication through a first conduit of a lubrication system;
   wherein the bevel gear assembly is supplied with lubrication through a second conduit of the lubrication system having an outlet portion with a plurality of holes.

20. The track drive system of claim 18, wherein the at least one drive axle is substantially enclosed by at least one axle housing shaft and at least one saddle that supports the continuous ground-engaging track.

* * * * *